United States Patent [19]

Gniffke et al.

[11] 3,716,253
[45] Feb. 13, 1973

[54] TRACTOR HITCH APPARATUS
[75] Inventors: Glenn D. Gniffke; Harold A. Fratzke, both of Cottonwood, Minn.
[73] Assignee: Metro Hydraulics Inc., Minneapolis, Minn.
[22] Filed: Jan. 27, 1971
[21] Appl. No.: 110,119

[52] U.S. Cl. ............280/415 A, 280/479 R, 172/248, 172/450, 280/446 R
[51] Int. Cl. .................................................B60d 1/00
[58] Field of Search ..280/479 A, 479 R, 461 A, 477, 280/415 A; 172/248

[56] References Cited

UNITED STATES PATENTS

| 3,266,817 | 8/1966 | Engstrom | 280/461 A |
| 3,347,564 | 10/1967 | Snoozy | 280/479 R |
| 3,427,046 | 2/1969 | Sommer et al. | 280/479 R |
| 2,531,768 | 11/1950 | Cline et al. | 172/248 |
| 3,172,686 | 3/1965 | Beard | 280/461 A |
| 3,531,140 | 9/1970 | Di Vita et al. | 280/477 |
| 3,542,399 | 11/1970 | Myers | 280/479 A |
| 3,421,779 | 1/1969 | Shelby | 280/479 R |

FOREIGN PATENTS OR APPLICATIONS

| 1,430,633 | 1/1966 | France | 415 A |

*Primary Examiner*—Leo Friaglia
*Attorney*—Merchant & Gould

[57] ABSTRACT

Tractor hitch apparatus including an automatic three-point hitch and a self-hooking draw-bar hitch is described. The hitch apparatus is adapted for attachment to a conventional three-point tractor hitch system.

6 Claims, 8 Drawing Figures

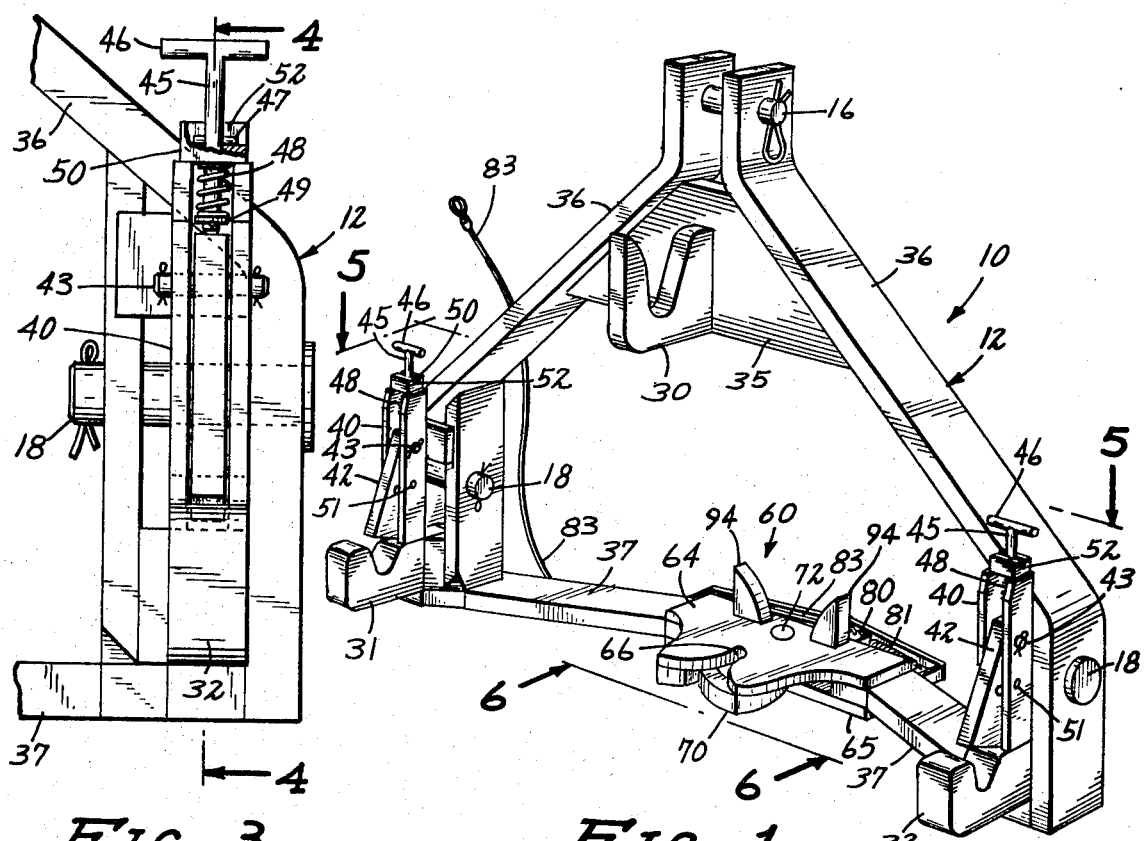
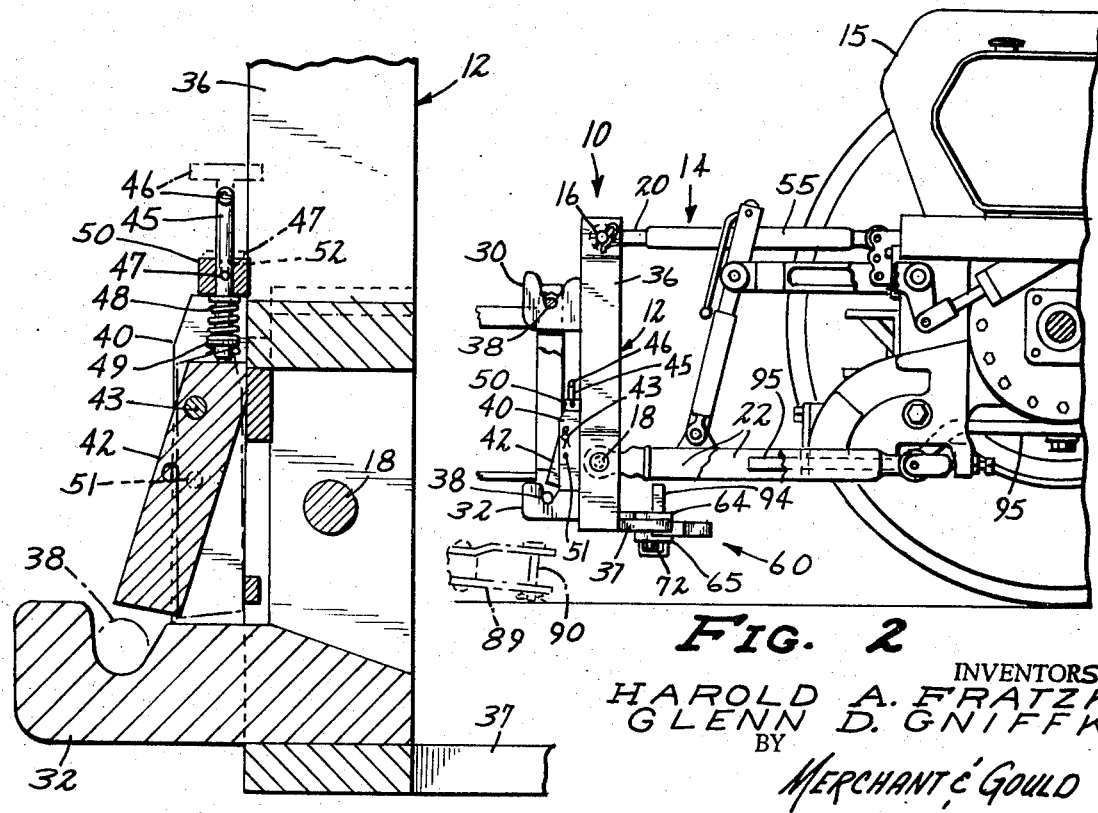

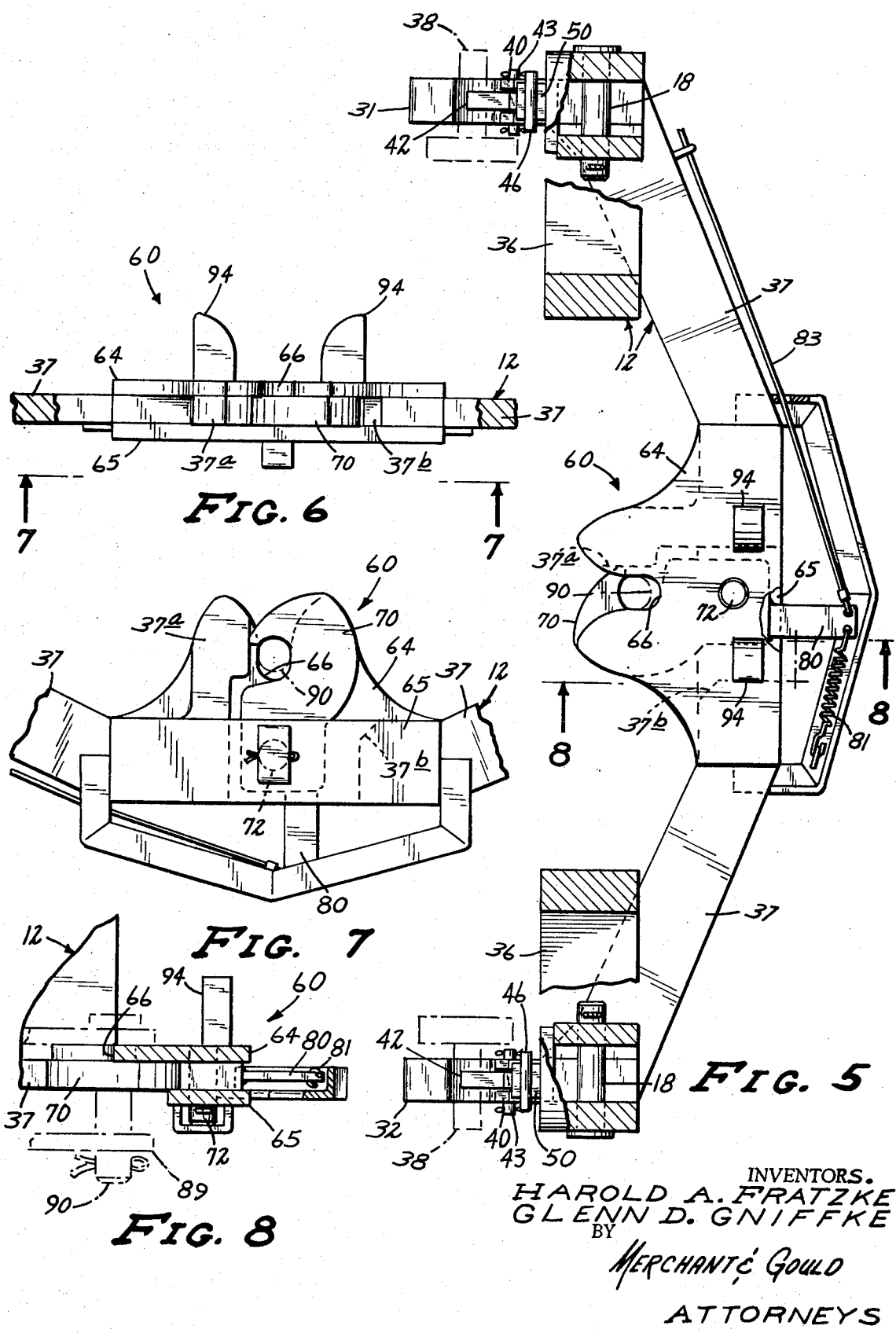

TRACTOR HITCH APPARATUS

BACKGROUND OF THE INVENTION

The present invention relates to hitch apparatus for connecting a drive vehicle to an implement.

Presently, drive vehicles such as the conventional farm tractor, are separately equipped with (1) a three-point hitch system for connecting the tractor to two-point or three-point type equipment (e.g. mounted equipment such as chisel plows, diggers, cultivators, etc.) and (2) a draw-bar hitch for connecting the tractor to pull-type equipment (e.g. trailers, discs, various types of rakes, etc.). Normally, the three-point hitches presently available are connected to the tractor hydraulic system so as to be moveable in a vertical plane. However, the draw-bar hitches provided as standard equipment on the conventional tractor are mounted to the underside thereof and, consequently, are not moveable in a vertical plane although they are usually free to move (i.e. swing) in a horizontal plane.

The tractor hitches presently available have numerous disadvantages. For example, the three-point hitch systems do not provide automatic coupling. Although there are numerous three-point hitch designs, they commonly necessitate positioning a number of connecting pins into various sized eyes (i.e. holes) to connect the tractor to the mounted equipment. This requires the tractor operator to leave his vehicle and manually insert the pins into the eyes. Frequently, the final alignment of the tractor and the equipment necessitates considerable trial-and-error positioning of the tractor. Thus, the task of connecting an implement to a three-point hitch is difficult and time-consuming. Similarly, the present tractor draw-bar hitches require insertion of a connecting pin through the implement clevis and the eye in the tractor draw-bar. Further, since the present draw-bars are not moveable in a vertical plane, the tractor operator must manually raise the clevis to the height of the tractor draw-bar. Frequently, jacks are used on heavy hitch equipment to raise the clevis to the proper height. Finally, the rigid tractor draw-bar can not be raised (e.g. hydraulically raised) after it is connected to the implement so as to transfer a portion of the force required to pull the implement to the rear tractor wheels thereby increasing the traction of the tractor.

SUMMARY OF THE INVENTION

The present invention provides hitch apparatus for use in combination with a conventional three-point hitch system. The hitch apparatus includes a frame which is attachable to presently available three-point hitch systems and which has three outwardly directed, hook-shaped members attached thereto in a generally triangular relationship. The three hook-shaped members are connectable to all standard three-point type equipment and, preferably, one or more of the hook-shaped members includes a latch mechanism for retaining the hitch connecting pins within the hook-shaped members. The frame also has attached thereto an outwardly directed, horizontally moveable (i.e. swingable) hook-like member. Preferably, this hook-like member is pivoted to the frame and swings laterally outward to receive a clevis connecting pin and then inward (e.g. by a spring bias) to connect therewith. In the preferred embodiment, cable means are connected to the hook-like member and extend to a position adjacent the operator's seat so as to allow the operator to swing the hook-like member laterally outward (i.e. by pulling the cable) thereby disconnecting the implement.

The present hitch apparatus substantially overcomes the before-mentioned disadvantages of the prior art hitches. It provides a singular hitch unit which is automatically connectable to all mounted and pull-type equipment. For example, the three triangularly spaced hook-like members eliminate the present need to align connecting pins and eyes in hitching an implement to a tractor's three-point hitch system. Similarly, the present hitch apparatus eliminates the need to manually insert a connecting pin through the implement clevis and the eye in the conventional tractor draw-bar. Instead, the hitch apparatus will automatically engage the clevis connecting pin without necessitating the manual handling thereof. Further, the hitch apparatus can be raised (e.g. hydraulically) to effect a transfer of the downward component of the force necessary to pull the implement to the rear tractor wheels thereby increasing the traction. Additional advantages of the present invention will become apparent from a reading of the Detailed Description included hereinbelow.

BRIEF DESCRIPTION OF THE DRAWINGS

FIG. 1 is a perspective view of the hitch apparatus provided by the present invention;

FIG. 2 is a fragmented side view showing the present hitch apparatus attached to a tractor and hitched to a three-point type implement;

FIG. 3 is an enlarged, fragmented front view of one of the bottom, hook-like members shown in FIG. 1;

FIG. 4 is a cross-sectional view taken along the section line 4—4 of FIG. 3;

FIG. 5 is an enlarged, horizontal cross-sectional view of the hitch apparatus taken along the line 5—5 of FIG. 1, portions thereof being broken away;

FIG. 6 is an enlarged, cross-sectional view along the section line 6—6 of FIG. 1;

FIG. 7 is a bottom view along the line 7—7 of FIG. 6; and

FIG. 8 is a cross-sectional view taken along the section line 8—8 of FIG. 5.

DETAILED DESCRIPTION OF THE PREFERRED EMBODIMENT

Turning now to the drawings, the hitch apparatus provided by the present invention is generally designated by the numeral 10. The hitch apparatus 10 includes a generally triangular shaped frame 12 having, as will be described subsequently, a plurality of hook-like members attached thereto which are connectable to both pull-type equipment and mounted equipment (i.e. either two-point or three-point type equipment).

As can be seen in FIG. 2, hitch apparatus 10 is used in combination with a conventional three-point hitch system 14 of a drive vehicle 15 (e.g. a standard farm tractor). Hitch apparatus 10 is connected to three-point hitch system 14 in essentially the same manner as a standard three-point type implement is connectable thereto. Frame 12 includes an upper link pin 16 and two bottom link pins 18 which connect to a top free arm 20 and two bottom lift arms 22, respectively, of the three-point hitch system 14. To so connect hitch apparatus 10 and three-point hitch system 14, the arms 20 and 22 are aligned with the hitch apparatus 10 and link pins 16 and 18 are inserted through eyes in the outward ends of arms 20 and 22. As illustrated, lift arms 22 are connected to the tractor's hydraulic system so as to allow vertical movement of the connected hitch apparatus 10.

Frame 12 of hitch apparatus 10 has attached thereto (e.g. by welding) three outwardly projecting, hook-like members 30, 31 and 32 which are spaced in a triangular relationship thereabout. Each of the hook-shaped recesses or hooks defined by members 30, 31 and 32 are upwardly facing. As illustrated, top hook-like member 30 projects perpendicularly outward from a cross member 35 extending between the two angular side members 36 of frame 12. The two bottom hook-like members 31 and 32 are attached to frame 12 at opposite ends of a base member 37 and extend outwardly in a manner similar to hook-like member 30.

The hook-like members 31 and 32 each include a similar latch mechanism for retaining an implement connecting pin (e.g. a connecting pin 38 as shown in FIG. 4) within the upwardly facing recess defined thereby. Only the latch mechanism associated with hook-like member 32 need be described. This latch mechanism includes a channel member 40 extending vertically upwardly from member 32. A latch bar 42 is pivotally attached to channel member 40 by a pin 43 extending through the two vertical sides of channel member 40 and a transverse hole in bar 42. As can be seen particularly well in FIG. 4, the pivot point of latch bar 42 is near the front edge thereof (i.e. off-center). A rod 45 having a T-handle 46 and a cross pin 47 extends vertically downward within channel member 40 to engage a top inclined surface of latch bar 42 near the rearward edge thereof. A coil spring 48 circumferentially positioned about rod 45 engages a washer-cotter pin combination 49 on rod 45 and the underside of a block member 50 so as to urge rod 45 downwardly. Block member 50 positioned above channel member 40 has a groove 52 extending thereacross and into which cross pin 47 will enter to allow downward movement of rod 45 on the urging of spring 48. This downward movement causes rod 45 to swing (i.e. pivot) latch bar 42 outwardly over the recess in hook-like member 32 (as particularly well shown in FIG. 4). With latch bar 42 in this latched position, connecting pin 38 is retained within hook-like member 32. To allow latch bar 42 to move to its unlatched position (i.e. its vertical position within channel 40 as shown in dotted lines in FIG. 4), T-handle 46 is pulled upwardly and turned 90° so that cross pin 47 rests on the top surface of member 50 preventing downward movement of rod 45. With T-handle 46 so positioned, latch bar 42 returns to its generally vertical, unlatched position. A pin (not shown) can be inserted through an opening 51 in the vertical sides of channel member 40 and a hole in latch bar 42 to retain bar 42 in this unlatched position.

The hook-like members 30, 31 and 32 define a three-point hitch which is connectable to a three-point implement in the following manner. The hook-like members 30, 31 and 32 are lowered (i.e. hydraulically) to a position beneath the implement connecting pins 38 and tractor 15 is manuvered so as to bring the hooks 30–32 in alignment with connecting pins 38. With the latch bars 42 in their unlatched position, hitch apparatus 10 is vertically lifted using the tractor's hydraulic system. Upon raising, the hook-like members 30, 31 and 32 engage connecting pins 38 and the implement is hitched to tractor 15. During the initial hitching operation, it may be necessary to adjust a turn buckle 55 forming a part of top arm 20 so as to align hook 30 and the top implement pin 38. As is apparent from this description, implement connecting pins 38 do not have to be manually handled (i.e. removed and then reinserted during the hitching operation).

Frame 12 of hitch apparatus 10 further includes a draw-bar hitch 60 attached to base member 37 thereof. As illustrated, an upper plate 64 and a lower plate 65 are attached to the upperside and underside, respectively, of base member 37 and extend between a centrally positioned separation or gap therein. Top plate 64 has an outwardly curved portion with a recess 66 therein. Bottom plate 65 has a rectangular shape. A flat, hook-like member 70 positioned between plates 64 and 65 is pivotally attached thereto by a pin 72 extending through plates 64 and 65 and an opening in member 70. The hook-shaped recess or hook defined by member 70 faces laterally outward. So mounted, member 70 is free to pivot (i.e. swing) laterally through a small arc between a closed position in which the tip of the hook abuts an outwardly directed portion 37a of base member 37 and an open position in which the back edge of the hook abuts a laterally extending portion 37b of member 37. A connecting member 80 attached to hook-like member 70 is connected to a coil spring 81 which urges hook-like member 70 toward its closed position. A cable 83 is also connected to member 80. Cable 83 extends to a position adjacent the operator's seat (not shown) on tractor 15 so as to allow hook-like member 70 to be swung to its open position without the operator leaving the tractor (i.e. by pulling cable 83). As illustrated, base 37 of frame 12 extends angularly inward so that hook-like member 70 is positioned inwardly from hook-like members 30, 31 and 32 so as not to interfere with the operation thereof.

A pull-type implement can be connected to the hitch apparatus 10 in the following manner. First, hitch apparatus 10 is lowered (i.e. hydraulically) to the same height as implement clevis 89 (shown in broken lines in FIGS. 2 and 8). Secondly, hook-like member 70 is laterally aligned with clevis connecting pin 90 (by movement of the tractor 15). The tractor 15 is then moved rearwardly toward clevis 89 causing connecting pin 90 to engage hook-like member 70 pivoting it toward its un-latched position. Upon further reverse movement, pin 90 enters the hook or recess defined by hook-like member 70 and spring 81 causes member 70 to close about pin 90 as shown in FIGS. 5 and 7. When it is desired to disconnect the implement, cable 83 is pulled causing the hook-like member 70 to move to its open position. Upon driving tractor 15 forward, the implement is disconnected therefrom.

As will be apparent from the above description, hitch apparatus 10 can be connected to a pull-type implement without necessitating any manual involvement (e.g. raising of clevis 89). In fact, connecting pin 90 does not even have to be removed from clevis 89 during the hitching operation. This significantly reduces the difficulty in connecting tractor 15 to a pull-type implement. Further, when connected, hitch apparatus 10 can be raised by the tractor hydraulic system so as to transfer a portion of the force required to pull the implement to the rear wheels of the tractor (i.e. the downward component of the resultant pulling force is transferred to the rear tractor wheels). This significantly increases the tractor's traction.

Two shoulder members 94 extend vertically upward from the upperside of plate member 64. The conventional tractor draw-bar 95 (shown in dotted lines in FIG. 2) can be telescoped or pulled out from its retracted position to fit between shoulder members 94. This substantially reduces cross sway of hitch apparatus 10.

The preferred embodiment described has numerous advantageous features. However, it should be understood that the above description is for illustrative purposes only and is not intended in any manner to limit the scope of the present invention. Numerous modifications to the described embodiment (e.g. changes in size to fit various category tractors) will be readily apparent to the artisan.

What is claimed is:

1. Hitch apparatus, comprising:
   a. a frame attachable to a drive vehicle;
   b. three outwardly projecting, hook-shaped members attached to said frame in a generally triangular relationship, two of said hook-shaped members lying in a generally horizontal plane and being disposed below the third hook-shaped member and connectable to three-point type implements; and
   c. draw-bar means attached to said frame and positioned between said two lower hook-shaped members and lying generally within said horizontal plane, said draw-bar means including a member directed outwardly therefrom in essentially the same direction as said three hook-shaped members, said member defining a hook-shaped recess therein engageable with a clevis connecting pin of pull-type implements and being attached to said frame so as to project outwardly therefrom to a point inward from said hook-like members.

2. The hitch apparatus of claim 1 wherein:
   a. said frame has a generally triangular shape and is attachable to a three-point hitch system of the drive vehicle, the base member of said triangular shaped frame extending angularly inward toward the three-point hitch system of the drive vehicle;
   b. said three hook-shaped members are each positioned adjacent a different one of the vertices of said triangular shaped frame and the hook-shaped recess defined by each of said members is upwardly facing; and
   c. said outwardly directed member of said draw-bar means is pivotally attached to the base member of said triangularly shaped frame for pivoting laterally outward to an open position to receive the clevis connecting pin within said recess and laterally inward to a closed position for engagement therewith.

3. The hitch apparatus of claim 2 wherein at least one of said three hook-like members has a latch mechanism associated therewith including a latch bar pivotally attached to said frame and spring biasing means engaging said latch bar for urging an end portion thereof to a position above said hook-shaped recess to retain the connecting pin of the three-point type implement therein.

4. The hitch apparatus of claim 3 including two shoulder members attached to said base member for engaging a tractor draw-bar therebetween so as to reduce cross-sway of the hitch apparatus.

5. The hitch apparatus of claim 4 wherein:
   a. said latch mechanism includes a pivotal latch bar and means for pivoting said latch bar to a position adjacent to and substantially above the recess defined by said hook-shaped member; and
   b. said draw-bar means includes:
      i. spring biasing means associated therewith for urging said outwardly extending member toward said closed position; and
      ii. cable means attached to said outwardly extending member and having a force applying end for providing movement of said member toward said open position on application of a force to said cable end.

6. Hitch apparatus for use in combination with a three-point hitch system, comprising:
   a. a frame attachable to the three-point hitch system;
   b. three outwardly projecting members attached to said frame in a generally triangular relationship and each having an upwardly facing hook-shaped recess therein, two of said outwardly projecting members lying in a generally horizontal plane and being disposed below the third outwardly projecting member, said members defining a three-point hitch connectable to a mounted implement;
   c. latch means associated with at least one of said outwardly projecting hook-like members including a latch bar pivotably attached to said frame for pivotable movement between an unlatched position and a latched position having an end portion positioned above said hook-like recess and spring biasing means engaging said latch bar so as to urge said bar toward said latched position; and
   d. a draw-bar member pivotally attached to said frame and positioned between said two lower outwardly projecting members and lying generally within said horizontal plane, said draw-bar member projecting outward therefrom to a point inward from the outermost projection of said three outwardly projecting members, said pivotal member defining a horizontally facing hook-shaped recess therein and pivoting laterally outward to receive an implement clevis pin within said hook-shaped recess and inward for engagement therewith.

* * * * *